UNITED STATES PATENT OFFICE.

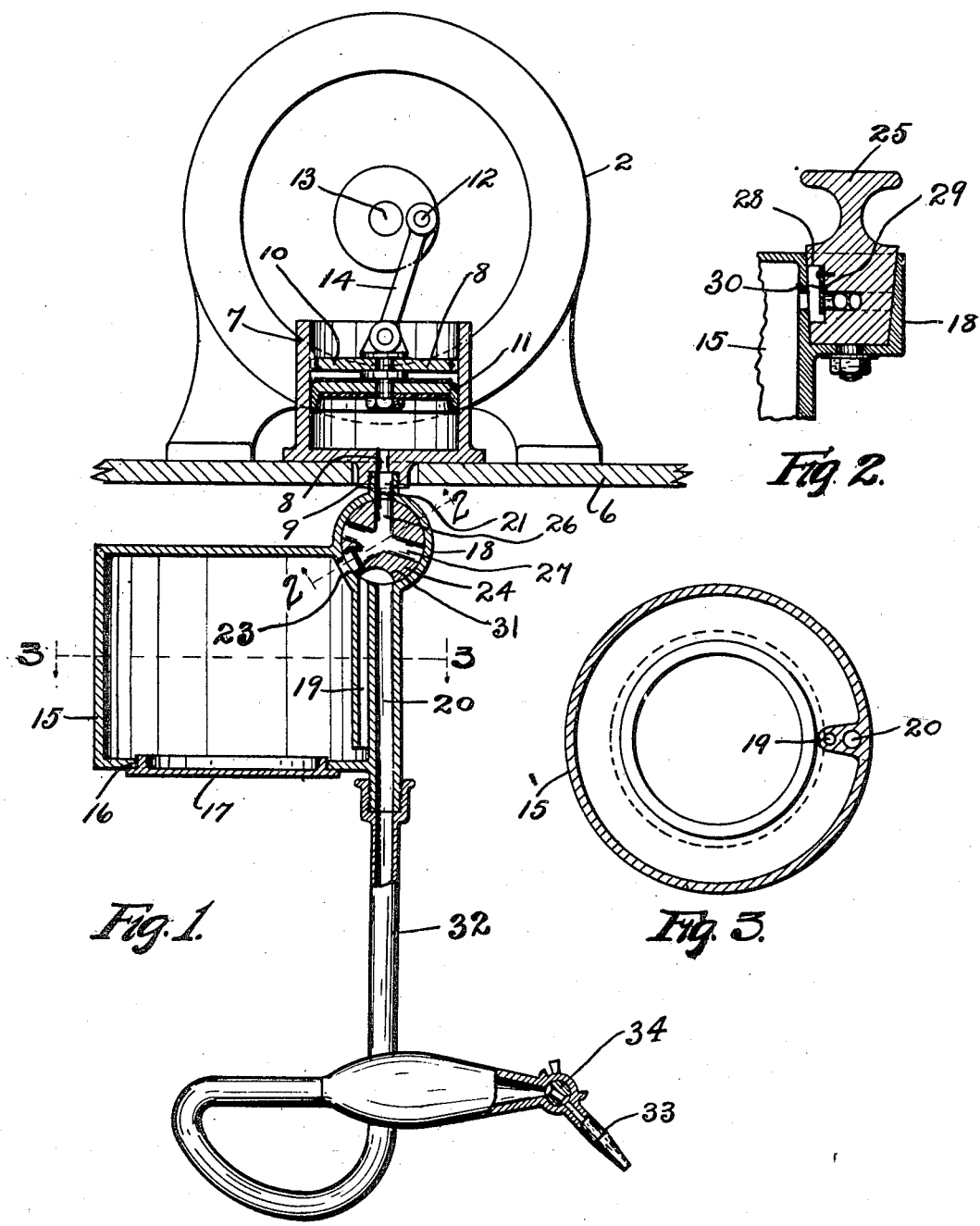

JOSEPH B. FEY, OF AKRON, OHIO.

VALVE FOR THERAPEUTIC APPARATUS.

1,069,685.　　　　　Specification of Letters Patent.　　Patented Aug. 12, 1913.

Application filed August 18, 1910. Serial No. 577,794.

*To all whom it may concern:*

Be it known that I, JOSEPH B. FEY, a citizen of the United States of America, residing at Akron, in the county of Summit and State of Ohio, have invented certain new and useful Improvements in Valves for Therapeutic Apparatus; and I hereby declare the following to be a full, clear, and exact description of the invention, such as will enable others skilled in the art to which it pertains to make and use the same.

This invention relates to improvements in therapeutic apparatus and especially to that class of apparatus designed to produce air currents for operating massage devices, sprayers, atomizers and the like.

The object of this invention is to provide in connection with such apparatus means for positively controlling and directing the air currents produced by the operation of said apparatus.

My invention therefore consists in providing in connection with a fluid system a new and improved rotary valve.

My invention also consists in the features of construction and combinations of parts described in the specification, pointed out in the claims and illustrated in the accompanying drawings.

In the accompanying drawings, Figure 1 is a central vertical section of an apparatus embodying my invention. Fig. 2 is a section on line 2—2, Fig. 1. Fig. 3 is a section on line 3—3, Fig. 1.

Again referring to the drawings, 2 represents a motor which may be driven by electricity or any other suitable motive power, and as shown the motor is mounted on a platform or support 6, and on said platform in proximity to said motor is mounted a cylinder 7 which is provided with an air-outlet 8 and around the said outlet is arranged a screw threaded boss 9. In the cylinder 7 is arranged a piston 10 having a cup-leather packing 11 the arrangement of which is such that when the piston is forced down into the cylinder the air therein will be forced out through the air outlet 8 and when the piston is drawn outwardly in the cylinder the said cylinder will fill with air. The piston 10 is operatively connected with a pin 12 eccentrically mounted on the drive shaft 13 of the motor by a piston rod 14.

Below the platform 6 is arranged a receptacle or air tank 15 having an opening 16 in the bottom thereof which is closed by a screw threaded stopper 17. Near the top and at one side of the receptacle 15 is arranged a valve casing 18 which is preferably formed integral with the said receptacle 15. In the wall of the receptacle 15 are arranged passageways 19 and 20. The passageway 19 at its upper end communicates with the interior of said valve-casing 18 and at its lower end with the interior of the said receptacle 15, and the passageway 20 communicates at its upper end with said valve casing 18 and at its lower end with the outer air, and at its lower end the wall of said passageway 20 is provided with an exterior screw thread. The valve casing 18 is also provided with an opening 21 around which is formed a screw threaded extension 22 which screws into the boss 9 on the bottom of the cylinder 7, and the said valve casing 18 is also provided with an opening 23 which communicates with the receptacle 15. Within the valve casing 18 is mounted a rotatable plug valve 24 which is preferably provided with a valve stem 25 by means of which it may be readily rotated. The said valve 24 is provided with passageways 26 and 27 which extend diametrically through said valve, and the said passageways intersect with each other at the center of the valve. The passageway 26 at one end is enlarged, as shown at 28, and therein is formed a valve seat 29. On the valve seat 29 is arranged a valve 30. On the perimeter of the valve 24 is formed a groove 31 which also forms a passageway as will appear later. To the screw threaded end of the passageway 20 is secured a flexible hose 32 which is provided with a nozzle 33 having a valve 34. The said nozzle 33 is provided with a tapered end on which any suitable massage device, sprayer, atomizer or the like may be mounted.

The operation of the embodiment of my invention shown in the accompanying drawing is as follows: If it is desired to secure a continuous stream or flow of air, such as would be desirable in connection with a spraying device, the valve 24 is turned to the position shown in Fig. 1, in which position the valved end of the passageway 26 will register with the inlet opening 23 of the receptacle 15 and the opposite end of said passageway 26 will register with the outlet opening 8 of the cylinder 7. Also the groove 31 will span the ends of the passageways 19 and 20. Therefore when the piston 10 is operated the air in the cylinder 7 will be forced down through the passageway 26 into the receptacle 15 on the downward stroke of said piston and will pass up through the passageway 19 into the valve casing 18, then through the groove 31 in the valve 24 and down the passageway 20 to the hose 32 and out through the nozzle 33. Now as the area of the inlet 23 to the receptacle 15 is greater than the area of the outlet of the nozzle more air will be forced into the receptacle 15 than can escape during the downward movement of the piston 10, but on the upward movement of the piston the valve 30 will close preventing the air in the receptacle 15 from being drawn back into the cylinder 7 and therefore the air will continue to flow out of the nozzle during the upward stroke of the piston. It is therefore possible to produce a constant and uninterrupted flow of air through the nozzle. If it is desired to produce an intermittent flow of air, such as might be utilized in operating a massage device, the valve 24 is turned so that one end of the passageway 27 registers with the outlet 8 of the cylinder 7 and the other end of said passageway registers with the passageway 20. In this position the valve 24 will close the inlet opening 23 to the receptacle 15 and also the passageway 19. Then when the piston is operated so as to force it down into the cylinder the air will be driven directly through the passageway 27, the passageway 20 and the hose 32 and out through the nozzle 33, but on the up stroke of the piston the air will be drawn back into the cylinder producing a vacuum or suction in the nozzle 33.

It will be understood that I do not wish to limit myself to the particular embodiment of my invention illustrated in the drawings as my invention can be applied to a variety of fluid or gas systems. It will also be understood that a receptacle 15 can be utilized for various purposes in addition to the function of an air storage tank as, for instance, the said receptacle can be equipped to serve as an ozonizer or as a disinfectant chamber.

What I claim is:—

1. The combination with a fluid or gas system, of a valve casing provided with two ports arranged diametrically opposite each other and with a port arranged intermediate of said diametrically arranged ports and a plug valve rotatably mounted in said valve casing, said valve having a passageway extending from side to side thereof through the center of said valve in a straight line and a second passageway extending from side to side of said valve and intersecting the first-mentioned passageway, said last-mentioned passageway being provided with a valve at one end thereof and the valved end of said passageway being arranged to register with the port in the valve casing which is arranged between the diametrically arranged ports when the other end of said passageway registers with the port in the casing which leads from the pump.

2. In a fluid or gas system, the combination of a pump, a motor for driving said pump, a closed receptacle, means establishing communication between said pump and said receptacle, a valve casing arranged in said means of communication between said pump and said receptacle, said valve casing being provided with a series of ports, one of which communicates with said receptacle and the other with said pump, a valve rotatably mounted in said valve casing and adapted to control said ports, said valve being provided with a passageway which extends through said valve, the ends of said passageway being adapted to register with said ports, a valve seat formed in said passageway and a valve adapted to rest on said seat for the purpose set forth.

3. In a fluid or gas system, the combination of a pump, a motor for driving said pump, a closed receptacle having an inlet and an outlet, means establishing communication between said pump and said receptacle, a valve casing arranged in said means of communication between said pump and said receptacle, said valve casing being provided with a series of ports, one of which communicates with the intake of said receptacle, one with the outlet of said receptacle, one with said pump and one with the outer air, a valve rotatably mounted in said valve casing and adapted to control the said ports, said valve being provided with a plurality of passageways which extend through said valve and intersect with each other, the ends of said passageways being adapted to register with said ports in the different positions of said valve, said valve being also provided with a groove adapted to span the port in the valve casing which communicates with the said receptacle and the port in the valve casing which communicates with the outer air.

In testimony whereof, I sign the foregoing specification, in the presence of two witnesses.

JOSEPH B. FEY.

Witnesses:
VICTOR C. LYNCH,
N. L. McDONNELL.